(12) United States Patent
Ranjan et al.

(10) Patent No.: US 7,546,512 B2
(45) Date of Patent: Jun. 9, 2009

(54) TECHNIQUES TO PERFORM ERROR DETECTION

(75) Inventors: Prashant Ranjan, Karnataka (IN); Jain Philip, Karnataka (IN); Muralidharan S. Chilukoor, Karnataka (IN)

(73) Assignee: Intel Corporation, Santa Clara, CA (US)

(*) Notice: Subject to any disclaimer, the term of this patent is extended or adjusted under 35 U.S.C. 154(b) by 978 days.

(21) Appl. No.: 10/948,896

(22) Filed: Sep. 23, 2004

(65) Prior Publication Data

US 2006/0075311 A1    Apr. 6, 2006

(51) Int. Cl.
*H03M 13/00* (2006.01)
(52) U.S. Cl. ............................ 714/758; 702/189
(58) Field of Classification Search ................ 714/758; 702/189
See application file for complete search history.

(56) References Cited

U.S. PATENT DOCUMENTS

2002/0053059 A1* 5/2002 Hara et al. .................. 714/758
2003/0159101 A1* 8/2003 Hyland et al. ............... 714/781
2005/0172205 A1* 8/2005 Lin et al. ..................... 714/758

* cited by examiner

*Primary Examiner*—Guy J Lamarre
(74) *Attorney, Agent, or Firm*—Kacvinsky LLC

(57) ABSTRACT

Method and apparatus to perform cyclic redundancy check computations for error detection are described wherein a first stage includes a first set of computation elements, a first multiplexer and a second multiplexer. A latch is connected to the first stage. A second stage is connected to the latch and the second stage includes a second set of computation elements and a third multiplexer. The first stage and the second stage perform cyclic redundancy check computations for a packet, with the first set of computation elements performing cyclic redundancy check computations for a first set of bytes of input data from the packet, and the second set of computation elements performing cyclic redundancy check computations for a second set of bytes of input data from the packet. Other embodiments are described and claimed.

18 Claims, 5 Drawing Sheets

TECHNIQUES TO PERFORM ERROR DETECTION

BACKGROUND

Packet based communication systems typically implement some form of error detection in the event a packet is lost or corrupted during transmission. One example of a technique used to perform the error detection is cyclic redundancy check (CRC). For a high speed network, the CRC computations may affect the performance and cost of the components used in the network. Consequently, improvements in techniques to perform error detection may result in improved network services.

DETAILED DESCRIPTION

Figure 1:
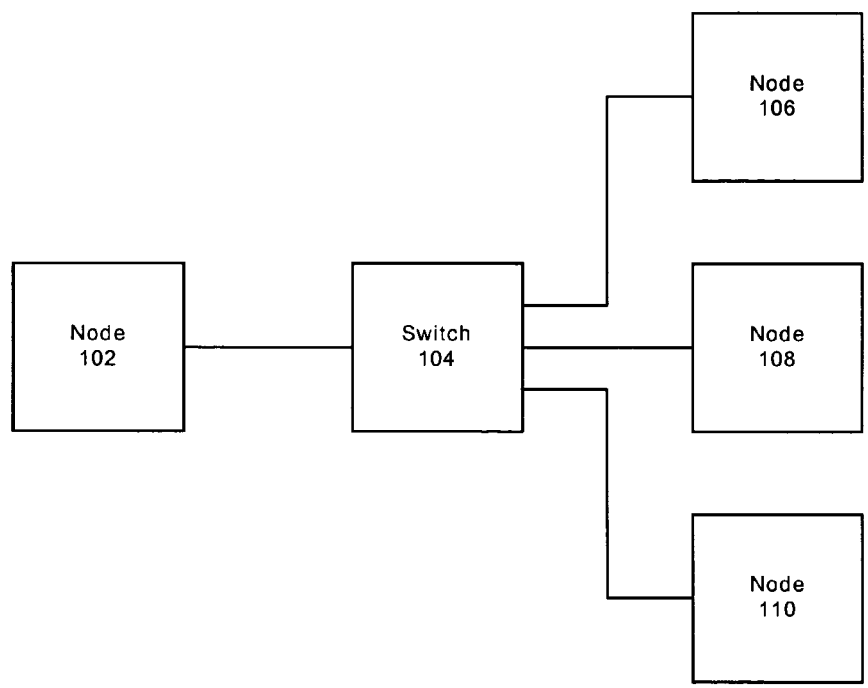
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), and so forth. The unique address may comprise, for example, a network address such as an Internet Protocol (IP) address, a device address such as a Media Access Control (MAC) address, and so forth. The embodiments are not limited in this context.

The nodes of system 100 may be connected by one or more types of communications media and input/output (I/O) adapters. The communications media may comprise any media capable of carrying information signals. Examples of communications media may include metal leads, printed circuit boards (PCB), backplanes, switch fabric, semiconductor material, twisted-pair wire, co-axial cable, fiber optics, radio frequency (RF) spectrum, and so forth. An information signal may refer to a signal which has been coded with information. The I/O adapters may be arranged to operate with any suitable technique for controlling information signals between nodes using a desired set of communications protocols, services or operating procedures. The I/O adapters may also include the appropriate physical connectors to connect the I/O adapters with a corresponding communications media. Examples of an I/O adapter may include a network interface, a network interface card (NIC), radio/air interface, disc controllers, video controllers, audio controllers, and so forth. The embodiments are not limited in this context.

The nodes of system 100 may be configured to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may comprise a packet network communicating information in accordance with one or more packet protocols, such as one or more Internet protocols. In another example, system 100 may communicate packets using a medium access control protocol such as Carrier-Sense Multiple Access with Collision Detection (CSMA/CD), as defined by one or more IEEE 802 Ethernet standards. The embodiments are not limited in this context.

Referring again to FIG. 1, system 100 may comprise nodes 102, 106, 108 and 110. In addition, system 100 may include a switch or router 104 (collectively referred to herein as "switch 104"). Although FIG. 1 is shown with a limited number of elements in a certain topology, it may be appreciated that system 100 may include more or less elements in any type of topology as desired for a given implementation. The embodiments are not limited in this context.

In one embodiment, for example, the various elements of system 100 may be arranged to communicate information over a wired communication medium as previously described. It is worthy to note that although the embodiments may be described in the context of a wired communications system, the principles discussed herein may also be implemented in a wireless communications system as well. If implemented as a wireless system, one or more nodes shown in system 100 may further comprise additional components and interfaces suitable for communicating information signals over the designated RF spectrum. For example, nodes 102, 106, 108 and 110, and switch 104, of system 100 may include omni-directional antennas, wireless RF transceivers, amplifiers, filters, control logic, and so forth. The embodiments are not limited in this context.

In one embodiment, system 100 may include nodes 102, 106, 108 and 110. Nodes 102, 106, 108 and 110 may comprise, for example, computers. The nodes can communicate information to each other in the form of packets. A packet in this context may refer to a set of information of a limited length, with the length typically represented in terms of bits or bytes. An example of a packet length might be 64 bytes. For example, node 102 may break a set of media information into a series of packets. Each packet may contain a portion of the media information plus some control information. The control information may assist various intermediate nodes to route each packet to its intended destination, such as one or more of nodes 106, 108 and 110. The destination node may receive the entire set of packets and use them to reproduce the media information from node 102.

In one embodiment, system 100 may include switch 104. Switch 104 may comprise a network switch or router operating in accordance with one or more media access control protocols, such as from the IEEE 802.3 series of Ethernet protocols. For example, switch 104 may be a high bandwidth switch, such as a Fast Ethernet switch operating at 100 megabits per second (Mbps), a Gigabit Ethernet switch operating at 1000 Mbps, and so forth. The embodiments are not limited in this context.

Switch 104 may switch packets between the various nodes of system 100. For example, switch 104 may switch packets from a source node to a destination node. Each packet may include a source address and destination address. Switch 104 may receive the packet, retrieve the destination address, and send the packet to an intermediate node or destination node based on the destination address.

As each packet is communicated over the communication path between the source node and destination node, errors may occur where one or more bits of the information carried by the packet are changed from the original information generated by the source node. Consequently, switch 104 may implement one or more error detection techniques to detect errors.

A well known error detection technique is cyclic redundancy check (CRC). Given a k-bit block of bits, or message, the transmitter generates an n-bit sequence, known as a frame check sequence (FCS). The resulting frame comprising k+n bits is divisible by some predetermined number. The receiver may divide the incoming frame by the predetermined number, and if there is no remainder or a known remainder, assumes there was no error.

In one embodiment, switch 104 may use CRC to perform error detection. Due to the high bandwidth of switch 104, however, conventional circuits to perform CRC detection may be unsatisfactory for a number of reasons. For example, switch 104 may use a wider data path than lower speed switches, such as 64 bits rather than 32 bits. Conventional CRC circuits originally designed for 32 bit data paths may be too slow to handle the throughput offered by the wider data paths. For those CRC circuits capable of operating at the speeds needed by the wider data paths, the area and power requirements may be significant. This may result in higher costs associated with CRC detection.

Some embodiments solve these and other problems using a CRC circuit that is capable of operating within the timing requirements of high throughput systems while reducing the equivalent gate count. System 100 in general, and switch 104 in particular, may be described in more detail with reference to FIGS. 2-5.

Figure 2:
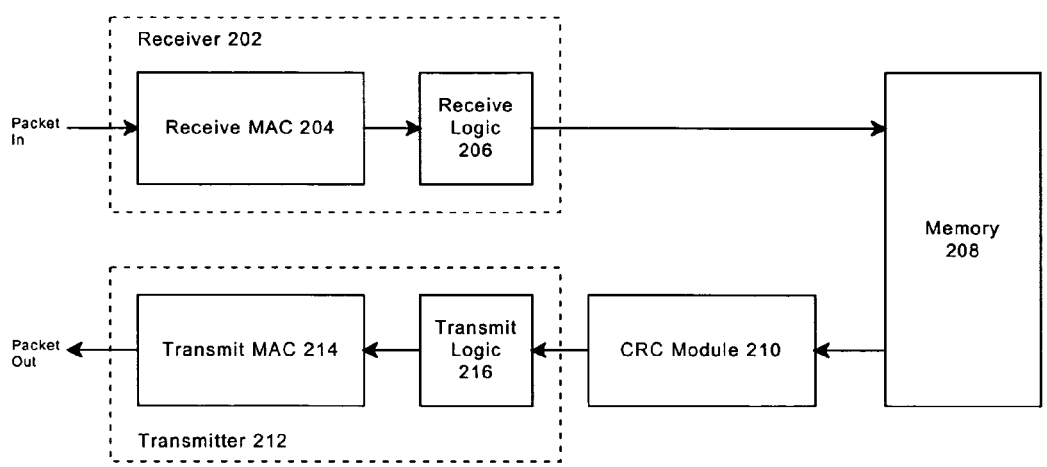
FIG. 2 illustrates a partial block diagram of a switch 104.

FIG. 2 illustrates a partial block diagram of switch 104. As shown in FIG. 2, switch 104 may comprise multiple elements, such as receiver 202, memory 208, CRC module 210, and transmitter 212. Receiver 202 may further include receive media access controller (MAC) 204 and receive logic 206. Transmitter 212 may further include transmit MAC 214 and transmit logic 216. One or more elements may be implemented in the form of, for example, circuits, components, registers, processors, software subroutines, or any combination thereof. Although FIG. 2 shows a limited number of elements, it can be appreciated that more or less elements may be used in switch 104 as desired for a given implementation. The embodiments are not limited in this context.

In one embodiment, switch 104 may include receiver 202. Receiver 202 may include receiver MAC 204 and receive logic 206. Receiver MAC 204 controls access to the communications media and is specific to the individual protocol. In one embodiment, for example, receiver MAC 204 may be implemented as an IEEE 802.3 MAC. All IEEE 802.3 MACs meet the same basic set of logical requirements, as modified to include one or more of the defined optional protocol extensions. Basic communication without optional protocol extensions between two network nodes may be established if both the transmit MAC and receive MAC support the same transmission rate. The IEEE 802.3 physical layer is specific to the transmission data rate, the signal encoding, and the type of media interconnecting the two nodes. Gigabit Ethernet, for example, is defined to operate over either twisted-pair or optical fiber cable, but each specific type of cable or signal-encoding procedure requires a different physical layer implementation. Receiver MAC 204 may perform conventional MAC layer operations, including data extraction, frame parsing, and error detection and correction.

In one embodiment, switch 104 may include memory 208. Memory 208 may comprise any machine-readable media, such as read-only memory (ROM), random-access memory (RAM), dynamic RAM (DRAM), synchronous DRAM (SDRAM), synchronous RAM (SRAM), Programmable ROM (PROM), Erasable PROM (EPROM), flash memory, magnetic disk, optical disk, and so forth. The embodiments are not limited in this context.

In one embodiment, switch 104 may include CRC module 210. CRC module 210 may be used to perform error detection for a packet. CRC module 210 may be arranged to perform the appropriate CRC computations for a packet, and compare the results with a known value to detect errors. If errors are detected, CRC module 210 may forward an error indication to receiver MAC 204. Receiver MAC 204 may take corrective actions to obtain valid packet data. CRC module 210 may be discussed in more detail below.

In one embodiment, switch 104 may include transmitter 212. Transmitter 212 may include transmit MAC 214 and transmit logic 216. Transmit MAC 214 may also be implemented as an IEEE 802.3 MAC corresponding to receive MAC 216. For example, transmit MAC 214 may perform conventional MAC layer operations, such as data encapsulation including frame assembly before transmission, media access control including initiation of frame transmission and recovery from transmission failure, and so forth.

On the receive side, receiver 202 of switch 104 may receive packets from a node, such as node 102. In processing the packets, receive MAC 204 may perform error detection using a CRC module. On the transmit side, transmitter 212 may transmit packets from switch 104 to another node, such as one of nodes 106, 108 and/or 110. In transmitting the packets, transmit MAC 214 may perform optional error detection using a CRC module. For both transmitting and receiving, the CRC module may comprise, for example, CRC module 210. Alternatively, receive MAC 204 and transmit MAC 214 may use separate CRC modules. The embodiments are not limited in this context.

In addition to receive MAC 204 and transmit MAC 214, CRC computations may also need to be performed within other parts of switch 104 as well. For example, a packet may be stored in memory 208. When a packet is retrieved from memory 208, the packet may need to be checked for any data corruption due to soft or hard errors that occur while in memory 208. Consequently, CRC module 210 may perform CRC computations on packets retrieved from memory 208, in addition to packets transmitted and received by transmit MAC 214 and receive MAC 204, respectively. CRC module 210 may be described in more detail with reference to FIGS. 3-5.

Figure 3:
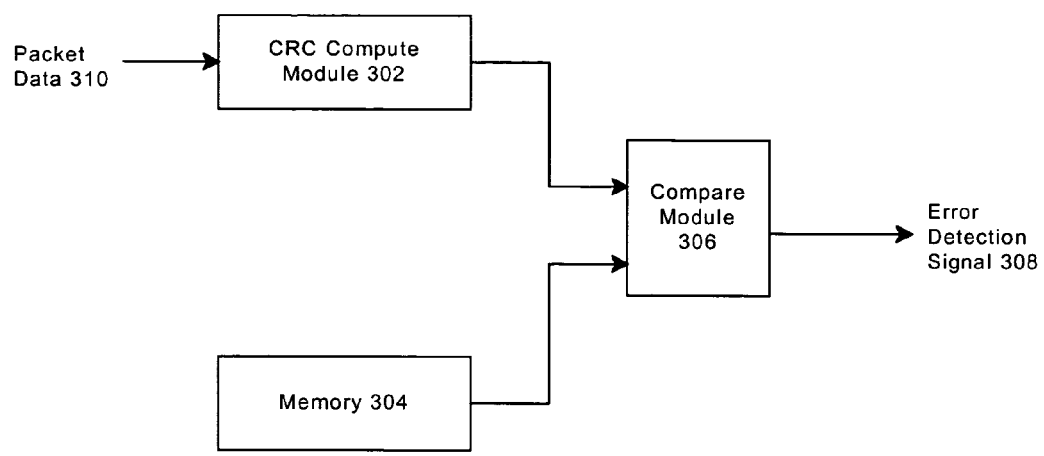
FIG. 3 illustrates a cyclic redundancy check (CRC) module 210.

FIG. 3 illustrates a block diagram for CRC module 210. As shown in FIG. 3, CRC module 210 may include a CRC compute module 302, memory 304, and a compare module 306. Although FIG. 3 shows a limited number of elements, it can be appreciated that more or less elements may be used in CRC module 210 as desired for a given implementation. The embodiments are not limited in this context.

In one embodiment, CRC module 210 may include CRC compute module 302. CRC compute module 302 may perform CRC computations for packet data. For example, CRC compute module 302 may receive packet data 310 over one or more clock cycles. CRC compute module 302 may be arranged to perform 32-bit CRC for a packet (or frame) where 64 bits of packet data 310 arrives every clock cycle. The polynomial used for CRC-32 may be the same as defined by the IEEE 802.3 series of specifications. For example, the polynomial for CRC-32 may be represented as follows:

$$x^{32}+x^{26}+x^{23}+x^{22}+x^{16}+x^{12}+x^{11}+x^{10}+x^{8}+x^{7}+x^{5}+x^{4}+x^{2}+x+1.$$

CRC compute module 302 may perform the CRC computations for packet data 310. The CRC computations may include dividing packet data 310 by a first predetermined number. CRC compute module 302 may then output a CRC final data value. The CRC final data value may be sent to compare module 306 to perform error detection.

In one embodiment, CRC module 210 may include memory 304. Memory 304 may be similar to memory 208. Further, memory 304 may comprise a portion of memory 208, or a non-contiguous memory unit separate from memory 208. Memory 304 may store a second predetermined number that is a known result for the CRC computations performed by CRC compute module 302. The second predetermined number may comprise, for example, a known value as defined in the IEEE 802.3 series of specifications. For example, the second predetermined value may comprise the value "0x C704DD7B," also referred to sometimes as the "Magic Number." Memory 304 may send the second predetermined value to compare module 306.

Compare module 306 may receive the CRC final data value from CRC compute module 302 and the second predetermined value from memory 304. Compare module 306 may compare the CRC final data value with the second predetermined value. Compare module 306 may then output an error detection signal 308 to indicate whether the CRC final data value matches or fails to match the second predetermined value. Error correction operations may be performed in the event of detected errors, such as retrieving packet data 310 from memory 208 again, requesting a resend of the packet from the source node, and so forth.

Figure 4:
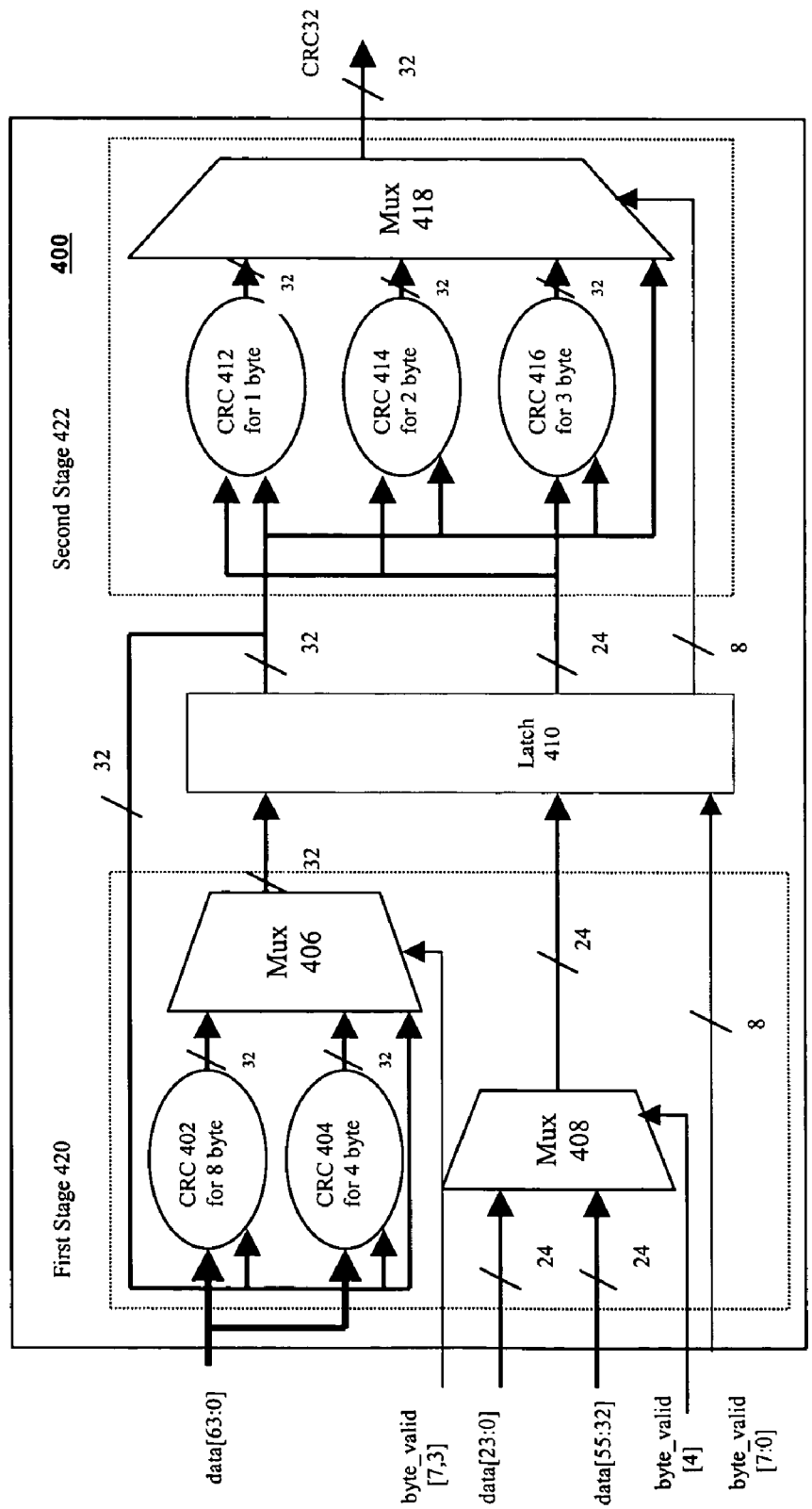
FIG. 4 illustrates a first circuit for a CRC compute module 302.

FIG. 4 illustrates a first circuit for a CRC compute module 302. FIG. 4 illustrates a first circuit 400 that may be implemented, for example, for CRC compute module 302. First circuit 400 may be used to perform 32-bit CRC for a packet where 64 bits of packet data arrives every clock cycle. First circuit 400 may accomplish this while conforming to the timing requirements of the wider data paths operating at higher frequencies, while reducing gate counts as compared to conventional techniques.

Conventional techniques to perform CRC-32 computations may be unsatisfactory for a number of reasons. For example, a general way of implementing CRC computation logic at high frequency may be to calculate CRC-32 for 1-8 Bytes in parallel in a single stage, select one of the CRC outputs, and feed the result to the next cycle. This kind of implementation, however, may have a relatively large area requirement. In fact, the area needed for such a technique may be double the area needed for CRC logic used for 32 bits of data input. Further, this technique may need an 8:1 multiplexer (MUX), and therefore there may be timing problems since the 8:1 MUX delay will be in a critical path for the circuit. The timing problem may potentially be solved by implementing techniques to bypass the 8:1 MUX delay for some portion of bytes in a packet. This will not, however, necessarily reduce the area requirements.

In one embodiment, first circuit 400 may perform CRC computations for a packet using multiple stages. For example, first circuit 400 may include a first stage 420 and a second stage 422. First stage 420 may perform CRC computations for a first set of bytes. The first set of bytes may comprise, for example, N×4 bytes wherein N is an integer. The first set of bytes may include all bytes for a packet except for the remaining 1-8 bytes processed during the last cycle for a packet. Second stage 422 may perform CRC computations for a second set of bytes. The second set of bytes may comprise, for example, M×1 bytes wherein M is an integer. The second set of bytes may include all remaining 1-8 bytes for a packet processed during the last cycle for a packet.

In one embodiment, first stage 420 may receive input data representing information from a packet over a data bus having varying widths. For example, the data bus may transport P bits of input data per clock cycle, where P is an integer. More particularly, the data bus may transport P×32 bits of input data. Thus when P=2, the data bus may transport 64 bits of input data [63:0] from a 64 bit data bus.

In one embodiment, first stage 420 may include multiple computation elements 402 and 404 and a first multiplexer 406. Computation elements 402 and 404 may each receive as a first input 8 or 4 bytes, respectively, of input data [63:0] from the 64 bit data bus per clock cycle. Computation elements 402 and 404 may each receive as a second input any intermediate CRC results computed by the computation elements from a previous clock cycle. Computation elements 402 and 404 may comprise CRC logic to perform CRC computations on a first set of bytes received from the data bus. For example, computation element 402 may be arranged to compute CRC-32 for 8 bytes of input data, while computation element 404 may be arranged to compute CRC-32 for 4 bytes of input data. The outputs from computation elements 402 and 404 may comprise intermediate CRC results if computation elements 402 and 404 are processing input data forming only a portion of bits from a complete packet or frame.

In one embodiment, first stage 420 may include a multiplexer 406. Multiplexer 406 may comprise, for example, a 3:1 multiplexer. Multiplexer 406 may have a first input and a second input to receive a first output from computation element 402 and a second output from computation element 404, respectively. Multiplexer 406 may also have a third input to receive intermediate CRC results generated during a previous clock cycle. Multiplexer 406 may receive a select signal to selectively output data from multiplexer 406.

Various multiplexer select signals may be used by first circuit 400. As shown in FIG. 4, the select signals may be implemented as various byte_valid signals. The byte_valid signals may be used to selectively output data from a multiplexer. The byte_valid signals may represent which input data is valid for any given clock cycle. For example, first circuit 400 may be used in a system where all 8 bytes of input data delivered by the data bus are valid (e.g., byte_valid=8'b 1111_1111) except in the last cycle where it can be any value between 1 to 8 bytes. The possible combinations of byte_valid bits for the last cycle may be shown in Table 1 as follows:

TABLE 1

| Byte Valid | Representation |
| --- | --- |
| 8'b 0000_0001 | 1 byte of input data is valid. |
| 8'b 0000_0011 | 2 bytes of input data are valid. |

TABLE 1-continued

| Byte Valid | Representation |
| --- | --- |
| 8'b 0000_0111 | 3 bytes of input data are valid. |
| 8'b 0000_1111 | 4 bytes of input data are valid. |
| 8'b 0001_1111 | 5 bytes of input data are valid. |
| 8'b 0011_1111 | 6 bytes of input data are valid. |
| 8'b 0111_1111 | 7 bytes of input data are valid. |
| 8'b 1111_1111 | 8 bytes of input data are valid. |

With respect to multiplexer 406, for example, byte_valid signal [7, 3] may indicate that 8 bytes of valid input data (8'b 1111_1111) are arriving from the data bus for processing by computation element 402, or that 4 bytes of valid input data (8'b 0000_1111) are arriving from the data bus for processing by computation element 404. Consequently, multiplexer 406 may receive intermediate CRC results from computation elements 402 and 404, and selectively output the appropriate intermediate CRC results to latch 410 in response to byte_valid signal [7, 3] set to the appropriate value.

In one embodiment, first stage 420 may also include a second multiplexer 408. Multiplexer 408 may comprise, for example, a 2:1 multiplexer. Multiplexer 408 may have a first input to receive input data [23:0] from the data bus, and a second input to receive input data [55:32] from the data bus. Multiplexer 408 may receive a select signal to selectively output data from multiplexer 408. The second select signal may comprise, for example, byte_valid signal [4].

In one embodiment, first circuit 400 may include a latch 410 positioned between first stage 420 and second stage 422. Latch 410 be implemented using multiple flip-flop units, and may store output from multiplexer 406 and multiplexer 408. Latch 410 may also store a byte_valid signal [7:0] for use by a multiplexer 418 of second stage 422. Latch 410 may send the intermediate CRC results from multiplexer 406 back to computation elements 402 or 404 to continue performing CRC computations on input data from a single packet. Latch 410 may also send data from first stage 420 and multiplexer 408 to second stage 422 for CRC computations or output.

In one embodiment, first circuit 400 may include second stage 422. Second stage 422 may include multiple computation elements 412, 414 and 416 and a third multiplexer 418. Computation elements 412, 414 and 416 may receive input data [23:0] or [55:32] from the data bus, and thus 1-3 bytes per clock cycle. Computation elements 412, 414 and 416 may comprise CRC logic to perform CRC computations on a second set of bytes received from the data bus. For example, computation element 412 may be arranged to compute CRC-32 for 1 byte of input data, computation element 414 may be arranged to compute CRC-32 for 2 bytes of input data, and computation element 416 may be arranged to compute CRC-32 for 3 bytes of input data. The outputs from computation elements 412, 414 and/or 416 may comprise a CRC final data value.

In one embodiment, second stage 422 may include a multiplexer 418. Multiplexer 418 may comprise, for example, a 4:1 multiplexer. Multiplexer 418 may have a first input, a second input, and a third input to receive a first output from computation element 412, a second output for computation element 414, and a third output from computation element 416, respectively. Multiplexer 418 may also have a fourth input to receive a CRC final result value from first stage 420 if generated by first stage 420. Multiplexer 418 may receive a select signal, such as byte_valid signal [7:0] received from latch 410, to selectively output data from multiplexer 418.

In operation, first stage 420 may receive 1-8 bytes of input data from a packet over the data bus each clock cycle. Typically, the data bus delivers 8 bytes of input data per clock cycle (e.g., first set of input data) until the last clock cycle needed to deliver the remaining bytes of data from a packet (e.g., second set of input data). For every cycle up to the last cycle, the 8 bytes of input data may be input to computation element 402 to perform a CRC-32 computation for the 8 bytes, and output intermediate CRC results to multiplexer 406. The byte_valid signal [7, 3] may be set to indicate 8 bytes of valid input data, and therefore multiplexer 406 may output the intermediate CRC results to latch 410. During the next clock cycle, latch 410 may output the intermediate CRC results to computation element 402 for use in CRC-32 computations for the next 8 bytes of the packet. These operations may continue until the last cycle.

During the last cycle, 1-8 bytes may be delivered to first stage 420, with the 1-8 bytes representing the remainder or last bytes of a packet. The remaining bytes may be processed by first stage 420 and/or second stage 422 depending upon the number of remaining bytes. For example, if the number of remaining bytes is 8 bytes or 4 bytes, the remaining bytes may be processed by first stage 420, and a CRC final data value may be output to a 32 bit output bus via second stage 422. If the number of remaining bytes is 1-3 bytes, the remaining bytes may be processed by second stage 422, and a CRC final data value may be output to the 32 bit output bus from second stage 422. If the number of remaining bytes is 5-7 bytes, the remaining bytes may be processed by a combination of first stage 420 and second stage 422, and a CRC final data value may be output to the 32 bit output bus from first stage 420 and second stage 422.

Assume the case where 8 bytes of remaining input data from a packet are delivered in the last cycle. The 8 bytes may be delivered to first stage 420. Computation element 402 may perform CRC-32 computations for the remaining 8 bytes, and output a CRC final data value to multiplexer 406. Multiplexer 406 may output the CRC final data value to latch 410 in response to the byte_valid signal being set to 8'b 1111-1111, indicating that the first input to multiplexer 406 should be output to latch 410. Latch 410 may output the CRC final data value to multiplexer 418 and a byte_valid signal [7:0] also set to 8'b 1111-1111. Multiplexer 418 may output the CRC final data value received from latch 410 in response to the byte_valid signal [7:0] set to 8'b 1111-1111, indicating that the fourth input to multiplexer 418 should be output to the 32 bit output data bus.

Assume the case where 4 bytes of remaining input data from a packet are delivered during the last cycle. The 4 bytes may be delivered to first stage 420. Computation element 404 may perform CRC-32 computations for the remaining 4 bytes, and output a CRC final data value to multiplexer 406. Multiplexer 406 may output the CRC final data value to latch 410 in response to the byte_valid signal being set to 8'b 0000-1111, indicating that the second input to multiplexer 406 should be output to latch 410. Latch 410 may output the CRC final data value to multiplexer 418, as well as a byte_valid signal [7:0] set to 8'b 0000-1111. Multiplexer 418 may output the CRC final data value received from latch 410 in response to the byte_valid signal [7:0] set to 8'b 0000-1111, indicating that the fourth input to multiplexer 418 should be output to the 32 bit output data bus.

Assume the case where 1-3 bytes of remaining input data from a packet are delivered during the last cycle. The 1-3 bytes may be delivered to a first input for multiplexer 408 of first stage 420 over the data bus [23:0]. The byte_valid signal [4] may be set to 1'b 0 to indicate multiplexer 408 should selectively output the data received over the first input, with all other values indicating that multiplexer 408 should selectively output the data received over the second input, or vice-versa. Multiplexer 408 may output the 1-3 bytes of remaining input data to latch 410. Latch 410 may output the 1-3 bytes of remaining input data to second stage 422.

Second stage 422 may receive the 1-3 bytes of remaining input data from latch 410. If there is 1 byte of remaining input data, computation element 412 may perform CRC-32 computations for the 1 byte and provide the output to multiplexer 418. If there are 2 bytes of remaining input data, computation element 414 may perform CRC-32 computations for the 2 bytes, and provide an output to multiplexer 418. If there are 3 bytes of remaining input data, computation element 416 may perform CRC-32 computations for the 3 bytes, and provide an output to multiplexer 418. Multiplexer 418 may receive byte_valid signal [7:0] to indicate the appropriate output for multiplexer 418.

Assume the case where 5-7 bytes of remaining input data from a packet are delivered during the last cycle. In this case, 4 bytes of the remaining 5-7 bytes of input data from a packet may be delivered to computation element 404 of first stage 420 for CRC computations, and the remaining 1-3 unprocessed bytes may be delivered to computation elements 412, 414 and 416, respectively, of second stage 422 via multiplexer 408 for CRC computations. In this manner, 5 bytes of remaining input data may be handled by a combination of computation element 404 (e.g., 4 bytes) and computation element 412 (e.g., 1 byte), 6 bytes of remaining input data may be handled by a combination of computation element 404 (e.g., 4 bytes) and computation element 414 (e.g., 2 bytes), and 7 bytes of remaining input data may be handled by a combination of computation element 404 (e.g., 4 bytes) and computation element 416 (e.g., 3 bytes).

Thus, in the case where there are 5-7 bytes of remaining input data from a packet to be delivered during the last cycle, 4 bytes of the remaining 5-7 bytes (e.g., bits 0-31) may be delivered to computation element 404. Computation element 404 may perform CRC-32 computations for the 4 bytes, and output intermediate CRC results to multiplexer 406. Multiplexer 406 may selectively output the intermediate CRC results to latch 410 in response to byte_valid signal [7:3]. Latch 410 may send the intermediate CRC results to multiplexer 418 of second stage 422.

The 1-3 unprocessed bytes of the 5-7 bytes of remaining input data from a packet may be delivered to a second input for multiplexer 408 of first stage 420 over the third data bus [55:32]. Multiplexer 408 may selectively output the data received over the second input in response to the appropriate byte_valid signal [4] to latch 410. Latch 410 may output the 1-3 unprocessed bytes of the 5-7 remaining input data to second stage 422.

Second stage 422 may receive the 1-3 unprocessed bytes of the 5-7 remaining input data from latch 410. If there is 1 unprocessed byte of remaining input data, computation element 412 may perform CRC-32 computations for the 1 byte, and provide an output to multiplexer 418. If there are 2 unprocessed bytes of remaining input data, computation element 414 may perform CRC-32 computations for the 2 bytes, and provide an output to multiplexer 418. If there are 3 unprocessed bytes of remaining input data, computation element 416 may perform CRC-32 computations for the 3 bytes, and provide an output to multiplexer 418. Multiplexer 418 may receive the byte_valid signal [7:0] to indicate the appropriate output for multiplexer 418.

Figure 5:
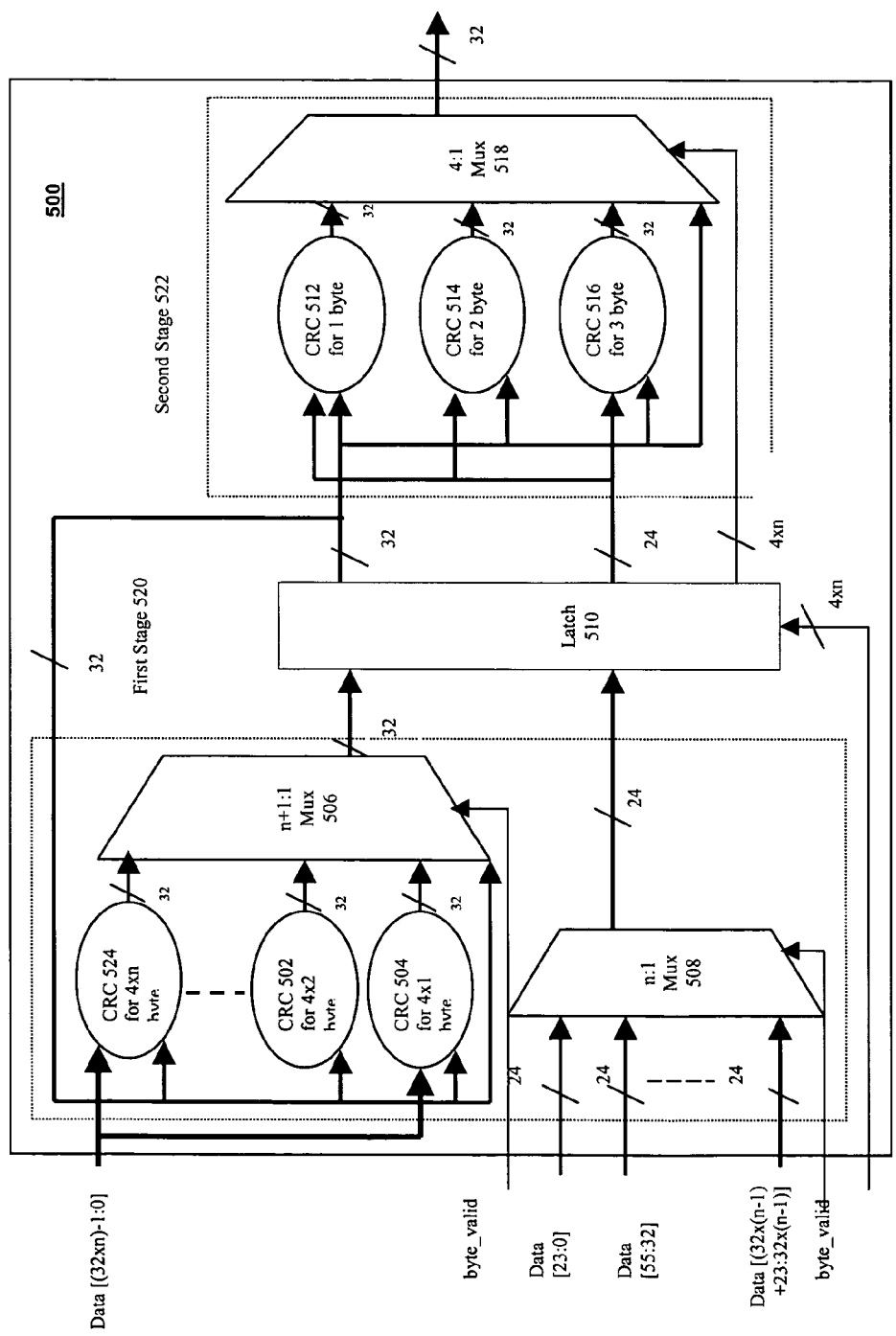
FIG. 5 illustrates a second circuit for CRC compute module 302.

FIG. 5 illustrates a second circuit for CRC compute module 302. FIG. 5 illustrates a second circuit 500 that may be implemented, for example, for CRC compute module 302. Second circuit 500 may be used to perform 32-bit CRC for a packet where 64 bits of packet data arrives every clock cycle. Second circuit 500 may comprise a generalized form of first circuit 400 for a 32×n bit data path, where n is an integer.

As shown in FIG. 5, second circuit 500 may include a first stage 520 and a second stage 522. First stage 520 and second stage 522 may be similar to first stage 420 and second stage 422, respectively, as described with reference to FIG. 4. First stage 520, however, may include a computation element 524 to perform CRC-32 computations for 4×n bytes, where n is an integer, with a data bus having a width of [32×(n−1)+23:32×(n−1)] to accommodate the varying number of bytes that may be delivered to first stage 520 during the last cycle of a packet. In addition, latch 510 may also include a reset line to reset the flip-flop units of latch 510 to a predetermined value. For example, the flip-flop units of latch 510 may be reset to all 1 (e.g., 0xFFFF_FFFF) before the start of every new packet to second circuit 500.

The embodiments may offer several advantages relative to conventional techniques. For example, some embodiments may achieve improved timing performance with reduced equivalent gate count. In some cases, the gate count requirement may be less than the gate count for a CRC implementation using only 32 bits of data input. This may be accomplished by removing some of the logic required for CRC calculation in the case of 5-7 bytes delivered during the last cycle. Instead of calculating CRC for 5-7 bytes of data in one clock cycle, some embodiments may accomplish this in 2 clock cycles. In the first clock cycle the CRC for 4 bytes is calculated in a first stage and the result is forwarded during the next clock cycle to a second stage where the CRC for the remaining 1-3 bytes is calculated. Since the condition of not all data being valid happens only in the last cycle, performing the CRC computation in two cycles will not have any impact on the frequency of operation of the embodiments. The CRC computation for 8 bytes of data during those cycles occurring before the last cycle may still be accomplished in a single clock cycle. As area requirements for CRC computations on n bytes increases with n, the amount of area saved may become more significant as n increases.

For 4 bytes or 8 bytes of valid input data, the CRC result (e.g., CRC32) will be available in the same clock cycle. For other values of valid input data, such as 1-3 bytes or 5-7 bytes, the CRC result will be available in the next clock cycle of data. To maintain uniformity for all the cases of byte_valid, the CRC result is typically made available in the next cycle of data only.

Some embodiments can be used to calculate or check the CRC on a continuous stream of data in any application specific integrated circuit (ASIC) or Field-Programmable Gate Array (FPGA) where high speed CRC calculations are needed. The embodiments may be particularly cost-effective in applications where the input data bus width is more than 32 bits and data is transmitted continuously at high frequency, e.g., on the order of 500 Megahertz (MHz) and higher. Some embodiments may also reduce the area appreciably and can operate at higher frequencies relative to conventional techniques. For example, for embodiments implemented using a 64 bit data bus, the area as measured by equivalent gates may be approximately 11,000 gates, with a delay in the critical path of 0.6 nanoseconds (ns), and a maximum operating frequency of 1667 MHz. Previous implementations performing CRC computations for 1-8 bytes in parallel may have an area of approximately 23,000 gates, with a delay in the critical path of 0.58-1.1 ns, and a max operating frequency of 909-1724 MHz. Consequently, some embodiments provide a performance improvement while consuming reduced area using a deep sub-micron process technology.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
    a first stage to include a first set of computation elements, a first multiplexer and a second multiplexer;
    a latch to connect to said first stage;
    a second stage to connect to said latch, said second stage to include a second set of computation elements and a third multiplexer, wherein a first computation element from said second set of computation elements is to perform cyclic redundancy checks for one byte, a second computation element from said second set of computation elements is to perform cyclic redundancy checks for two bytes, and a third computation element from said second set of computation elements is to perform cyclic redundancy checks for three bytes; and
    wherein said first stage and said second stage perform cyclic redundancy check computations for a packet, with said first set of computation elements to perform cyclic redundancy check computations for a first set of bytes of input data from said packet, and said second set of computation elements to perform cyclic redundancy check computations for a second set of bytes of input data from said packet.

2. The apparatus of claim 1, wherein said latch comprises multiple flip-flop units and a reset line, said reset line to reset said flip-flop units to a predetermined value.

3. The apparatus of claim 1, wherein said first set of bytes comprises N×4 bytes, where N is an integer.

4. The apparatus of claim 1, wherein said second set of bytes comprises M×1 bytes, where M is an integer.

5. The apparatus of claim 1, wherein a first computation element from said first set of computation elements is to perform cyclic redundancy checks for eight bytes, and a second computation element from said first set of computation elements is to perform cyclic redundancy checks for four bytes.

6. The apparatus of claim 1, further comprising a bus to connect to said first stage, said bus to communicate P bits of input data per processing cycle, where P is an integer.

7. The apparatus of claim 1, further comprising a bus to connect to said first stage, said bus to communicate P×32 bits of input data per processing cycle, where P is an integer.

8. The apparatus of claim 1, further comprising a bus to connect to said first stage, said bus to communicate up to 64 bits of input data per processing cycle.

9. A system, comprising:
    an antenna;
    a transceiver to connect to said antenna;
    a cyclic redundancy check compute module, said cyclic redundancy check compute module to include:
        a first stage to include a first set of computation elements, a first multiplexer and a second multiplexer;
        a latch to connect to said first stage;
        a second stage to connect to said latch, said second stage to include a second set of computation elements and a third multiplexer, wherein a first computation element from said second set of computation elements is to perform cyclic redundancy checks for one byte, a second computation element from said second set of computation elements is to perform cyclic redundancy checks for two bytes, and a third computation element from said second set of computation elements is to perform cyclic redundancy checks for three bytes; and
        wherein said first stage and said second stage perform cyclic redundancy check computations for a packet, with said first set of computation elements to perform cyclic redundancy check computations for a first set of bytes of input data from said packet, and said second set of computation elements to perform cyclic redundancy check computations for a second set of bytes of input data from said packet.

10. The system of claim 9, wherein said latch comprises multiple flip-flop units and a reset line, said reset line to reset said flip-flop units to a predetermined value.

11. The system of claim 9, wherein said first set of bytes comprises N×4 bytes and said second set of bytes comprises M×1 bytes, where N and M are both integers.

12. The system of claim 9, wherein a first computation element from said first set of computation elements is to perform cyclic redundancy checks for eight bytes, and a second computation element from said first set of computation elements is to perform cyclic redundancy checks for four bytes.

13. The system of claim 9, further comprising a bus to connect to said first stage, said bus to communicate P×32 bits of input data per processing cycle, where P is an integer.

14. An apparatus, comprising:
- a first stage to include multiple computation elements and a first multiplexer, said computation elements to perform cyclic redundancy check computations on a first set of bytes and output intermediate data, said first multiplexer to receive said intermediate data and a first select signal to selectively output said intermediate data;
- a second multiplexer having multiple input lines, said second multiplexer to receive a second set of bytes on one of said input lines and a second select signal to selectively output said second set of bytes;
- a latch to store said intermediate data or said second set of bytes; and
- a second stage to process said second set of bytes, said second stage to include multiple computation elements and a third multiplexer, wherein a first computation element for said second stage performs cyclic redundancy checks for one byte, a second computation element for said second stage performs cyclic redundancy checks for two bytes, and a third computation element for said second stage performs cyclic redundancy checks for three bytes, said computation elements to perform cyclic redundancy check computations on said second set of bytes and output final data, said third multiplexer to receive said final data and a third select signal to selectively output said final data.

15. The apparatus of claim 14, wherein said latch comprises multiple flip-flop units and a reset line, said reset line to reset said flip-flop units to a predetermined value.

16. The apparatus of claim 14, wherein said first set of bytes comprises N×4 bytes, and said second set of bytes comprises M×1 bytes, where N and M are both integers.

17. The apparatus of claim 14, wherein a first computation element for said first stage performs cyclic redundancy checks for eight bytes, and a second computation element for said first stage performs cyclic redundancy checks for four bytes.

18. The apparatus of claim 14, further comprising a bus to connect to said first stage, said bus to communicate P×32 bits of input data per processing cycle, where P is an integer.

* * * * *